United States Patent
Lauer

(10) Patent No.: US 10,512,118 B2
(45) Date of Patent: *Dec. 17, 2019

(54) MESH NETWORK BASED AUTOMATED UPLOAD OF CONTENT TO AIRCRAFT

(71) Applicant: GOGO LLC, Chicago, IL (US)

(72) Inventor: Bryan Adrian Lauer, Chicago, IL (US)

(73) Assignee: GOGO LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/873,179

(22) Filed: Jan. 17, 2018

(65) Prior Publication Data

US 2018/0146505 A1 May 24, 2018

Related U.S. Application Data

(63) Continuation of application No. 15/014,333, filed on Feb. 3, 2016, now abandoned, which is a continuation
(Continued)

(51) Int. Cl.
*H04W 84/00* (2009.01)
*H04H 20/71* (2008.01)
(Continued)

(52) U.S. Cl.
CPC .......... *H04W 84/005* (2013.01); *H04H 20/40* (2013.01); *H04H 20/62* (2013.01);
(Continued)

(58) Field of Classification Search
CPC ......... H04W 84/00; H04W 8/24; H04B 7/184
See application file for complete search history.

(56) References Cited

U.S. PATENT DOCUMENTS 7,599,691 B1    10/2009   Mitchell
RE42,536 E       7/2011   Leuca et al.
(Continued)

FOREIGN PATENT DOCUMENTS

CN   1640017 A    7/2005
CN   101971160 A  2/2011
(Continued)

OTHER PUBLICATIONS

International Search Report in related PCT Application No. PCT/US13/39634 dated Jul. 16, 2013.
(Continued)

*Primary Examiner* — Jinsong Hu
*Assistant Examiner* — Farideh Madani
(74) *Attorney, Agent, or Firm* — Marshall, Gerstein & Borun LLP; Randall G. Rueth

(57) ABSTRACT

The Automated Content Upload System networks a plurality of aircraft together when they are parked at the gates of an airport. Communications among the aircraft are guided by a Content Manager, resident at or near the airport, which maintains data representative of InFlight Entertainment Content presently stored on each aircraft and the list of scheduled InFlight Entertainment Content available on each aircraft. The Content Manager guides the exchange of InFlight Entertainment Content among the aircraft, as well as from the Content Manager to the aircraft, to automatically distribute InFlight Entertainment Content to the aircraft efficiently and timely. This process includes the ability to multicast data from the Content Manager to multiple aircraft in a single transmission, obtaining content delivery efficiency, populating multiple aircraft via a single transmission from the Content Manager. Furthermore, the Content Manager can supplement this process via transmissions to the aircraft in flight over the Air-To-Ground link.

20 Claims, 5 Drawing Sheets

Related U.S. Application Data of application No. 14/553,641, filed on Nov. 25, 2014, now Pat. No. 9,287,999, which is a continuation of application No. 13/544,742, filed on Jul. 9, 2012, now Pat. No. 8,934,893.

(51) Int. Cl.
  *H04H 20/40* (2008.01)
  *H04H 20/62* (2008.01)
  *H04H 60/80* (2008.01)
  *H04L 29/08* (2006.01)

(52) U.S. Cl.
  CPC ............ *H04H 20/71* (2013.01); *H04H 60/80* (2013.01); *H04L 67/12* (2013.01)

(56) References Cited

U.S. PATENT DOCUMENTS

| | | | |
|---|---|---|---|
| 8,934,893 | B2 | 1/2015 | Lauer |
| 9,287,999 | B2 | 3/2016 | Lauer |
| 2005/0208958 | A1 | 9/2005 | Bahl et al. |
| 2006/0141930 | A1 | 6/2006 | Keen et al. |
| 2009/0070841 | A1* | 3/2009 | Buga .................. H04L 67/12 |
| | | | 725/116 |
| 2009/0077594 | A1 | 3/2009 | Milosevski et al. |
| 2009/0081947 | A1* | 3/2009 | Margis ............... H04B 7/18508 |
| | | | 455/3.02 |
| 2010/0291961 | A1 | 11/2010 | Buga et al. |
| 2010/0333164 | A1 | 12/2010 | Schultz et al. |
| 2012/0030717 | A1 | 2/2012 | Buga et al. |
| 2012/0090011 | A1 | 4/2012 | Ezaki et al. |
| 2013/0314257 | A1* | 11/2013 | Macrae ................. G08C 17/00 |
| | | | 340/971 |
| 2015/0079897 | A1 | 3/2015 | Lauer |
| 2016/0157296 | A1 | 6/2016 | Lauer |

FOREIGN PATENT DOCUMENTS

| | | |
|---|---|---|
| EP | 2870764 A4 | 3/2016 |
| WO | WO-20140113101 A1 | 7/2014 |

OTHER PUBLICATIONS

State Intellectual Property Office of P.R. China, The Notification of the First Office Action for Chinese Patent Application No. 201380046864.0, dated Apr. 27, 2017.
Office Action, Canadian Patent Application No. 2,881,518, dated Jun. 23, 2017.
Office Action, Canadian Patent Application No. 2,881,518, dated Oct. 19, 2016.
Office Action, Canadian Patent Application No. 2,881,518, dated Jan. 18, 2018.
Australian Patent Application No. 2013289121, Examination Report No. 1, dated Jun. 30, 2016.
Australian Patent Application No. 2013289121, Notice of Acceptance, dated Jul. 5, 2017.
European Patent Application No. 13817409.9, Communication Pursuant to Article 94(3) EPC, dated Dec. 1, 2016.
European Patent Application No. 13817409.9, Decision to Refuse, dated Mar. 28, 2019.
European Patent Application No. 13817409.9, Extended European Search Report, dated Jan. 29, 2016.
Summons to Attend Oral Proceedings, European patent application No. 13817409.9, dated Oct. 17, 2018.
Office Action, Indian Patent Application No. 787/CHEP/2015, dated Jan. 24, 2019.
Office Action, Canadian Patent Application No. 2,881,518, dated Jan. 4, 2019.

\* cited by examiner

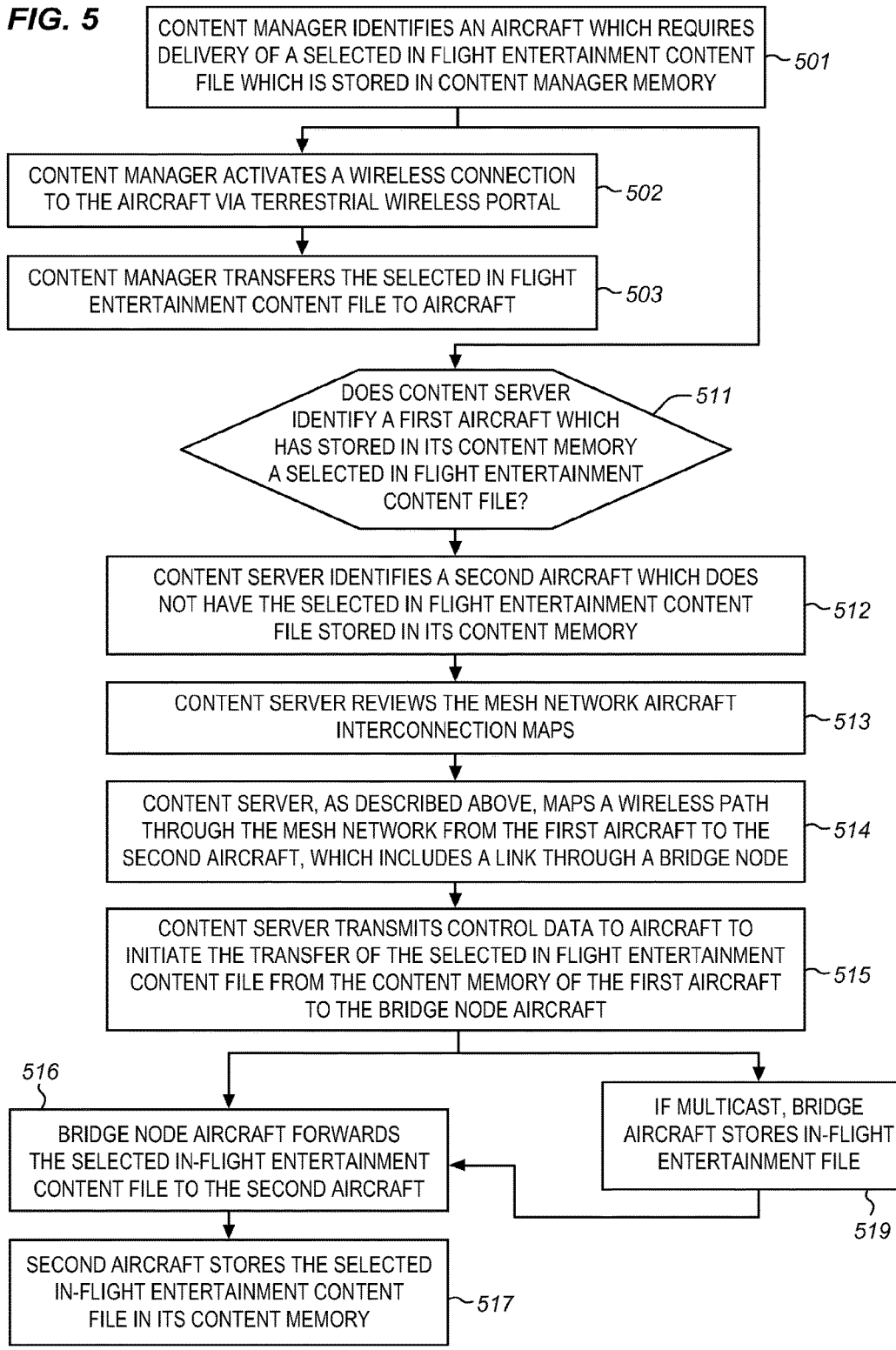

MESH NETWORK BASED AUTOMATED UPLOAD OF CONTENT TO AIRCRAFT

CROSS REFERENCE TO RELATED APPLICATIONS

This present application is a continuation application that claims priority to and the benefit of the filing date of U.S. application Ser. No. 15/014,333, filed Feb. 3, 2016 and entitled "Mesh Network Based Automated Upload of Content to Aircraft", which claims priority to and the benefit of U.S. application Ser. No. 14/553,641, filed Nov. 25, 2014, which issued as U.S. Pat. No. 9,287,999 on Mar. 19, 2015 and is entitled "Mesh Network Based Automated Upload of Content to Aircraft", which claims priority to and the benefit of the filing date of U.S. application Ser. No. 13/544,742 filed on Jul. 9, 2012, which issued as U.S. Pat. No. 8,934,893 on Jan. 13, 2015 and is entitled "Mesh Network Based Automated Upload of Content to Aircraft", the entire contents of which are hereby incorporated by reference herein.

FIELD OF THE INVENTION

This invention relates to InFlight Entertainment Content which is delivered to passengers on an aircraft and, in particular, to a communication system that provides aircraft with high speed delivery of new InFlight Entertainment Content via a mesh network to enable InFlight Entertainment Content to be populated on the Content Manager which is located on the aircraft by wirelessly transferring InFlight Entertainment Content files from other aircraft or from a central Content Manager.

BACKGROUND OF THE INVENTION

It is a problem in the field of InFlight Entertainment to provide passengers on all the aircraft of a particular carrier with the most current In-Flight Entertainment Content for delivery either to the passenger's wireless personal communication devices or aircraft-based displays. Air-To-Ground communications, such as between an aircraft in flight and Air-To-Ground terrestrial sites, fails to provide sufficient bandwidth to transmit all of the InFlight Entertainment Content from the Air-To-Ground terrestrial sites to the aircraft in flight. As a result, InFlight Entertainment Content is typically manually loaded onto the InFlight Entertainment server which is located in each aircraft via portable media (USB sticks) when the aircraft is parked at an airport gate. Thus, every InFlight Entertainment Content update requires a visit to an aircraft by maintenance personnel. The two weaknesses with this method are the cost to distribute and swap the USB sticks, and the time it takes to accomplish this: the effort to create a new USB stick, ship, and swap the USB stick in all of the aircraft of a carrier takes about 3 to 4 weeks. This is an expensive and inefficient process, which is lacking in timeliness of InFlight Entertainment Content delivery. In addition, the coordination of these InFlight Entertainment Content deliveries is complex and prone to human error, especially since the aircraft are transient and can be rerouted to meet the needs of the airline or for weather/maintenance events.

Another method in loading InFlight Entertainment Content on the aircraft is via wireless download (3G Cellular/4G Cellular/WiFi connectivity). The issues with wireless connectivity are the data file size of InFlight Entertainment Content (1 GB/movie), the extent of wireless coverage, and the cost of wireless service; it can be very costly to go down this path vs. manually swapping out USB sticks. In addition, at a busy airport, the ability to concurrently transmit InFlight Entertainment Content to multiple aircraft while they sit at the gate is inconsistent.

Therefore, there presently is no reliable, effective, cost-efficient way of delivering InFlight Entertainment Content to aircraft.

BRIEF SUMMARY OF THE INVENTION

The above-described problems are solved and a technical advance achieved in the field by the present Mesh Network Based Automated Upload of Content To Aircraft (termed "Automated Content Upload System" herein) which functions to network a plurality of aircraft, and optionally user wireless personal communication devices, together when they are on the ground at an airport, typically when parked at the gates of an airport. The communications among the aircraft are guided by a Content Manager, typically resident at or near the airport, which maintains data representative of the InFlight Entertainment Content presently stored on each aircraft, as well as the list of scheduled InFlight Entertainment Content that is to be available on each aircraft. The Content Manager guides the exchange of InFlight Entertainment Content data among the aircraft as well as from the Content Manager to the aircraft to automatically distribute InFlight Entertainment Content to the aircraft in an efficient and timely manner. Included in this process is the ability to multicast data from the Content Manager to multiple aircraft in a single transmission, thereby obtaining InFlight Entertainment Content delivery efficiency by populating multiple aircraft via a single transmission from the Content Manager. Furthermore, the Content Manager can supplement this process via transmissions to the aircraft, when in flight, over the existing Air To Ground link. Finally, the users' portable wireless personal communication devices, such as those belonging to aircraft crew, passengers, and the like (collectively termed "users" herein), can be made a temporary node in the mesh network and used to transport content onboard the aircraft or function as a relay point between a source and the next device in the network, as is described below.

In addition, the term "InFlight Entertainment Content" includes movies, music, WEB pages, catalogs, magazines, and any other data that the aircraft passengers may wish to view on their wireless personal communication devices while in flight on the aircraft.

BRIEF DESCRIPTION OF THE DRAWINGS

FIG. 5 illustrates, in flow diagram form, the operation of the Automated Content Upload System in loading InFlight Entertainment Content to multiple aircraft located at an airport.

DETAILED DESCRIPTION OF THE INVENTION

Figure 1:
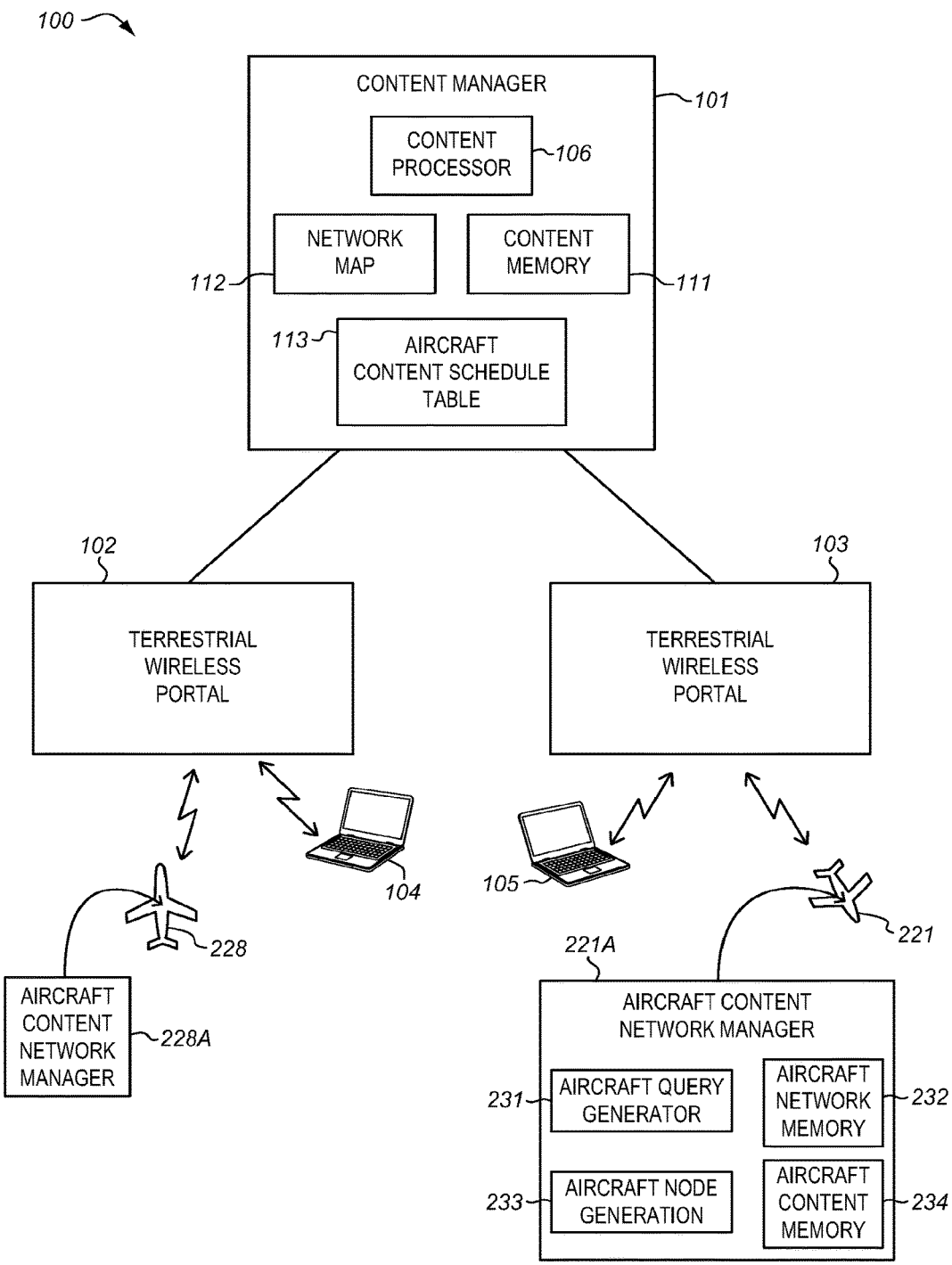
FIG. 1 illustrates the Automated Content Upload System in block diagram form.

The Automated Content Upload System 100 functions to network a plurality of Aircraft 221-228 together when they are located at an airport and/or parked at the Gates 211G, 212G of an airport. FIG. 1 illustrates the Automated Content Upload System 100 in block diagram form. The Automated Content Upload System 100 includes a Content Manager 101, which is the repository of InFlight Entertainment Content, as well as the source of control of the mesh network that is established among the aircraft parked at the airport. The Automated Content Upload System 100 also includes one or more Terrestrial Wireless Portals 102, 103 which provide the radio frequency links between the Content Manager 101 and the Aircraft 221-228 (as well as users' Wireless Personal Communication Devices 104, 105).

The Content Manager 101 guides the exchange of InFlight Entertainment Content data among the Aircraft 221-228 as well as from the Content Manager 101 to the Aircraft 221-228 to automatically distribute InFlight Entertainment Content to the Aircraft 221-228 in an efficient and timely manner. The Automated Content Upload System 100 has a plurality of the following attributes:

1. Locate, identify and communicate with all aircraft (network nodes) via Terrestrial Wireless Portals;
2. Perform network registration of each aircraft in an autonomous, automatic manner;
3. Authenticate aircraft (network nodes) on the network to ensure they are legitimate network nodes;
4. Establish regular "all is well" internal communications to verify network health;
5. Establish self-test algorithms in order to verify network functionality;
6. Able to relay data from aircraft to the next; and
7. Able to download content data to multiple aircraft even though data entry into the network is at a single point.
8. Locate, identify, and authenticate users for qualification as temporary mobile nodes in the network.

Network Topology

A mesh network is a local area network (LAN) that employs one of two connection arrangements: full mesh topology or partial mesh topology. In the full mesh topology, each node is connected directly to each of the others. In the partial mesh topology, some nodes may be connected to all the others, but some of the nodes are connected only to those other nodes with which they exchange the most data. The mesh network topology is a peer-to-peer system where a node can send and receive messages, but each node also functions as a router and can relay messages for its neighbors. Through this relaying process, a packet of data finds its way to its ultimate destination, passing through intermediate nodes with reliable communication links. If node fails in this network, the messages are automatically routed through alternative paths.

Physical Orientation of the Network

As shown in FIG. 1, the Automated Content Upload System 100 includes not only a processor, termed Content Manager 101, but also one or more Terrestrial Wireless Portals 102, 103 which function to wirelessly communicate with the Aircraft 221-228. The Content Manager 101 includes an associated Content Memory 111 which functions to store InFlight Entertainment Content for distribution to Aircraft 221-228 as well as a Network Map 112 which identifies the communication connections among the Aircraft 221-228 and, optionally, users' Wireless Personal Communication Devices 104, 105. The Content Manager 101 also includes an Aircraft Content Schedule Table 113 which lists data that identifies the individual aircraft and the content that is presently scheduled to be resident in this aircraft's Aircraft Content Memory 234. Thus, Content Manager 101 can determine what content needs to be loaded on a particular Aircraft 221 by comparing a list of content presently stored in this aircraft's Aircraft Content Memory 234 and content presently scheduled to be resident in this aircraft's Aircraft Content Memory 234 as noted in Aircraft Content Schedule Table 113.

Each Aircraft 221-228 includes an Aircraft Content Network Manager 221A that consists of a server which implements the aircraft-centric portion of the Automated Content Upload System 100. The Aircraft Content Network Manager 221A includes an Aircraft Content Memory 234 that stores the content for distribution to the passengers onboard this aircraft. The Aircraft Content Network Manager 221A also includes an Aircraft Query Generator 231 for wirelessly polling nearby aircraft to establish and update the mesh network that is used to exchange content among the Aircraft 221-228 and from Content Manager 101 to identified Aircraft 221-228. Aircraft Network Memory 232 maintains a record of the nearby aircraft in wireless communication range of the Aircraft 221, and Aircraft Node Registration 233 is a process that shares the collected Aircraft Network Memory content and a list of content stored in the Aircraft Content Memory 234 with the Content Manager 101, as described below.

Figure 2:
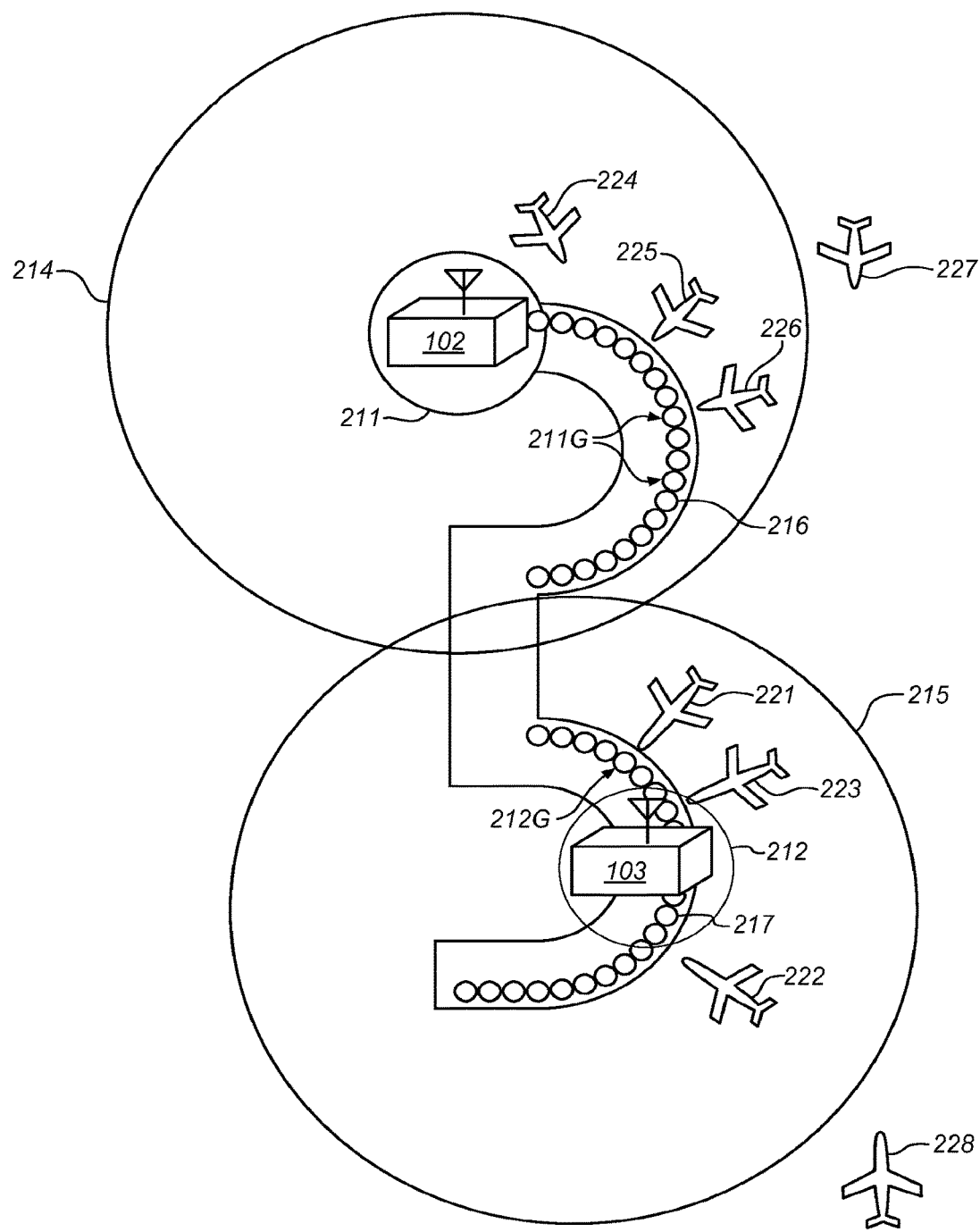
FIG. 2 illustrates a typical airport configuration with multiple aircraft parked at gates.

FIG. 2 illustrates a typical airport configuration with multiple Aircraft 221-228 parked at Gates 211G, 212G. Typically, but not necessarily, a Terrestrial Wireless Portal 102 may be physically installed at a location of an airport terminal building serving a plurality of gates, such as location 211 in the familiar 'multi-horseshoe' topography, diagrammatically illustrated in FIG. 1. Where an airport contains multiple terminals or has a large number of gates distributed over a substantial airport area, the airport may be equipped with one or more additional Terrestrial Wireless Portal 103 locations, shown at 212 in FIG. 1, in order to ensure complete gate coverage.

The locations of Terrestrial Wireless Portals 102, 103 are such that, regardless of its location, each of Aircraft 221-228 is assured of having a wireless terrestrial data link with a Terrestrial Wireless Portal 102, 103 of the Automated Content Upload System 100. The spacing between Terrestrial Wireless Portals 102, 103 is such as to provide overlapping terrestrial link communication coverage, as indicated by overlapping circles 214 and 215, whose respective radii encompass the entirety of their associated multi-gate areas 216 and 217.

Mesh Network Creation

In order to support communication among the Aircraft 221-228 and with the Content Manager 101, the mesh network must be established and periodically updated as aircraft arrive and depart from their respective gates and users flow through the terminals and aircraft. As an example, assume that a mesh network among Aircraft 221-226 and Content Manager 101 is established and presently active. The process of creation of a network can be understood by describing the process of adding a new node to an existing network and then extrapolating this process to the case where no network is initially active.

Figure 3:
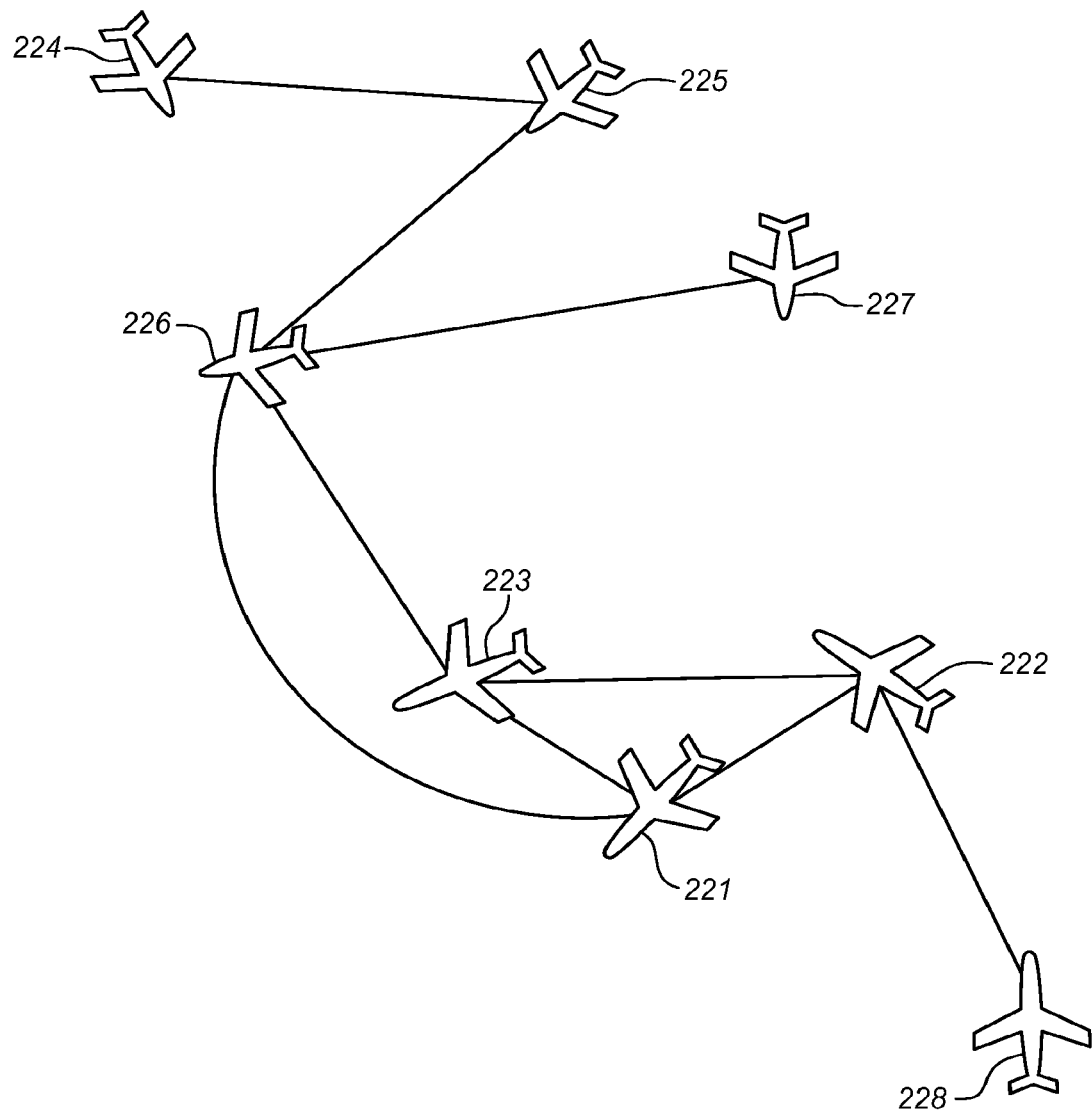
FIG. 3 illustrates a map of aircraft interconnections in the network.
Figure 4:
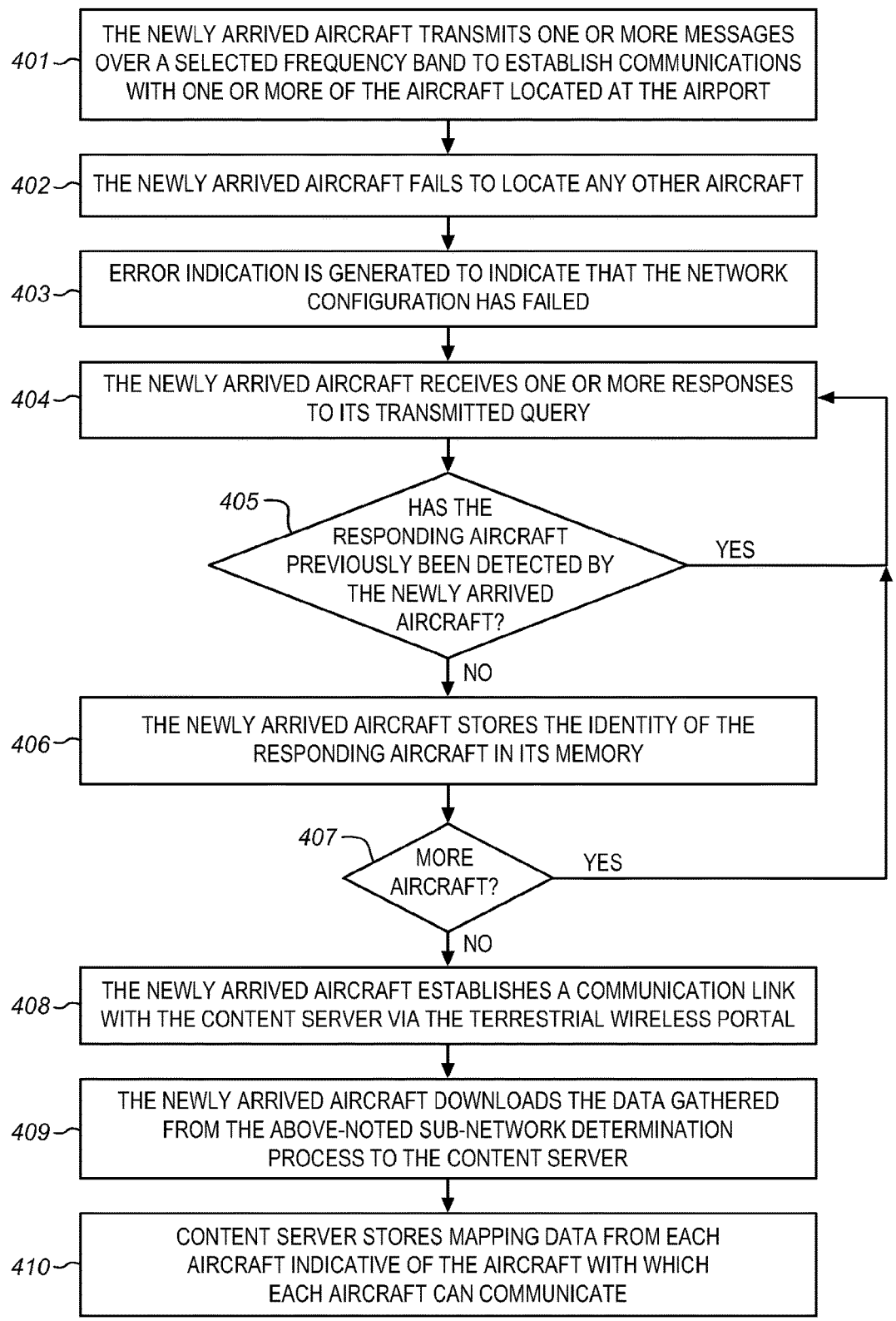
FIG. 4 illustrates in flow diagram form the operation of the Automated Content Upload System in defining wireless interconnections among multiple aircraft located at an airport.

FIG. 4 illustrates in flow diagram form the operation of the Automated Content Upload System 100 in defining wireless interconnections among multiple Aircraft 221-228 located at an airport, as shown diagrammatically in FIG. 3. This process of adding a node to the network entails the newly arrived Aircraft 221 at step 401 activating Aircraft Query Generator 231 to transmit one or more messages over a selected frequency band to establish communications with one or more of the Aircraft 222 located at the airport. If, at step 402, the newly arrived Aircraft 221 fails to locate any other aircraft, then this is an error condition, since the network must contain two or more nodes. Therefore, processing advances to step 403 where an error indication is generated to indicate that the network configuration has failed.

Otherwise, at step 404, the newly arrived Aircraft 221 receives one or more responses to its transmitted query and stores the identity of the responding Aircraft 222, 223 in its Aircraft Network Memory 232 at step 405. If this responding Aircraft (222, for example) has not previously been detected by the newly arrived Aircraft 221, then the number of primary proximate nodes has changed and processing returns to step 404 where the next responsive response (from Aircraft 223, for example) is received and analyzed as noted above. The steps 404-406 are repeated until all of the responses received by newly arrived Aircraft 221 have been processed. At this juncture, all of the Aircraft 222, 223 that are proximate to the newly arrived Aircraft 221 are identified and their identities stored in the Aircraft Network Memory 232 of newly arrived Aircraft 221. The identified nodes that are proximate to and communicable with newly arrived Aircraft 221 form the sub-network for the newly arrived Aircraft 221 within the composite mesh network. In a like manner, all individual Aircraft 222 to 223 have their own sub-networks of nodes which are respectively communicable to themselves, respectively.

The newly arrived Aircraft 221 then activates Aircraft Node Registration 233 to establish a communication link at step 407 with the Content Manager 101 via the Terrestrial Wireless Portal 102. The newly arrived Aircraft 221 downloads the data gathered from the above-noted sub-network determination process and stored in Aircraft Network Memory 232 to the Content Manager 101, which stores mapping data in Network Map 112 from each aircraft indicative of the other airport resident aircraft with which each aircraft can communicate. The Content Manager 101 maintains a multi-dimensional map which charts the interconnections among the aircraft that support the exchange of data. FIG. 3 illustrates a map of aircraft interconnections in the network as stored in Network Map 112.

For the sake of simplicity, the incorporation of users' wireless personal communication devices 104, 105 into the mesh network is not described, although the process is substantially the same as that articulated for aircraft. Since crew members can be identified and their respective flight assignments predetermined, it is advantageous to load content onto their wireless personal communication devices and have these devices propagate content as the crew members move among their respective aircraft assignments. Thus, the propagation of content is significantly enhanced by the addition of a multitude of crew members to the content propagation process. In addition, the crew members' wireless personal communication devices can upload content to the aircraft while the crew member is onboard and the aircraft is in flight. Thus, the temporal and spatial extent of the content loading process is expanded, even though the aircraft has left the terminal, since the content load process continues.

The following description is aircraft-centric for simplicity of description, but the use of the term "aircraft" can include users' wireless personal communication devices as one embodiment of a content delivery node. This node is mobile and is not constrained to be located at a particular gate in the terminal; in fact, it is expected to roam throughout the airport and be resident in various aircraft and at various gates during their tenure at this airport. Thus, the users' wireless personal communication devices are part of the network in the form of mobile repositories of content, with their physical movement from one aircraft to another or from the airport terminal to an aircraft results in the content being available to load into the content memory of the aircraft on which the user is located. Thus, the users' wireless personal communication devices typically do not "store and forward" content via wireless links as the aircraft do; they do store content and manually position themselves inside an aircraft to download the content to the aircraft content memory.

Content Data Distribution

FIG. 5 illustrates in flow diagram form the operation of the Automated Content Upload System 100 in loading InFlight Entertainment Content to multiple aircraft located at an airport. In the Automated Content Upload System 100, as described above, aircraft associate with other aircraft at the gates via aircraft-to-aircraft wireless links. Thus, each aircraft has a "thin link" to the Content Manager 101 via the Terrestrial Wireless Portal 102, 103 and a fat WiFi pipe to the aircraft it is meshed with. At this point, the Content Manager 101 pushes data to specific aircraft via the Terrestrial Wireless Portal 102, 103; and these aircraft push the received content (or content already stored on the aircraft) to other aircraft, as identified to the aircraft, via the WiFi mesh.

The Content Manager 101 stores each aircraft's location, mesh connectivity, mesh link performance, Terrestrial Wireless Portal link performance, as well as a list of content that is stored on the aircraft and a list of content that presently should be stored on the aircraft. The Content Manager 101 also knows the Terrestrial Wireless Portal 102, 103 data budget remaining for the month.

Thus, at step 501, Content Processor 106 of the Content Manager 101 identifies an Aircraft 221 which requires delivery of a selected InFlight Entertainment Content file which is stored in Content Manager Memory 111. Content Processor 106 makes this determination by comparing a list of content presently stored in this aircraft's Aircraft Content Memory 234 and content presently scheduled to be resident in this aircraft's Aircraft Content Memory 234 as noted in Aircraft Content Schedule Table 113. Content Manager 101, at step 502, activates a wireless connection to Aircraft 221 via Terrestrial Wireless Portal 103. Content Manager 101 then, at step 503, transfers the selected InFlight Entertainment Content file to Aircraft 221 via Terrestrial Wireless Portal 103. Another file transfer mode is executed airplane-to-airplane when Content Manager 101 at step 511 identifies a first Aircraft 228 which has stored in its content memory a selected InFlight Entertainment Content file. At step 512, the Content Manager 101 identifies a second Aircraft 221 which does not have the selected InFlight Entertainment Content file stored in its content memory. At step 513, Content Manager 101 reviews the mesh network aircraft interconnection maps, as described above and, at step 514, maps a wireless path through the mesh network from the first Aircraft 228 to the second Aircraft 221, which includes a link through a bridge node (Aircraft 222) to enable the data transfer to take place. Content Manager 101, at step 515, transmits control data to Aircraft 221, 222, and 228 to initiate the transfer of the selected InFlight Entertainment Content file from the content memory of the first Aircraft 228 to the bridge node Aircraft 222 at step 516, which forwards the selected InFlight Entertainment Content file to the second Aircraft 221 at step 517, which stores the selected InFlight Entertainment Content file in its Aircraft Content Memory 334 at step 518.

Since the bandwidth of the aircraft-to-aircraft WiFi link is greater than the bandwidth of the Terrestrial Wireless Portals 102, 103, the transfer of the selected InFlight Entertainment Content file as described above is effected more quickly. In addition, the use of the aircraft as data transfer elements reduces the processing load on the Content Manager 101. Furthermore, Content Manager 101 can use data multicasting to transfer the selected InFlight Entertainment Content file to multiple target aircraft in a single file transfer operation. Thus, Content Manager 101 in the transmission of control data to Aircraft 221, 222, and 228 at step 515 defines a data multicast mode, rather than a point-to-point transmission as described above. This control data causes the first Aircraft 228 to initiate the transfer of the selected InFlight Entertainment Content file from the content memory of the first Aircraft 228 to the bridge node Aircraft 222 at step 516, which stores the selected InFlight Entertainment Content file in its content memory at step 519 and forwards the selected InFlight Entertainment Content file to the second Aircraft 221 at step 517, which stores the selected InFlight Entertainment Content file in its Aircraft Content Memory 334 at step 518.

The Content Manager 101 typically has a plurality of design goals:
1. Minimize the amount of content downloaded over the Terrestrial Wireless Portal;
2. Minimize time to get content on aircraft;
3. Ability to prioritize content distribution (what is high priority, what is low);
4. Each aircraft checks neighboring aircraft inventory and synchronizes/updates content without the need for Content Manager interaction; and
5. File Transfer methods must support frequent breaks in connectivity and file transfer resumption from different sources (servers).

Summary

The Automated Content Upload System networks a plurality of aircraft together when they are on the ground at an airport, typically when parked at the gates of an airport. The communications among the aircraft are guided by a Content Manager which maintains data representative of the InFlight Entertainment Content presently stored on each aircraft, as well as the list of scheduled InFlight Entertainment Content that is to be available on each aircraft. The Content Manager guides the exchange of InFlight Entertainment Content data among the aircraft, as well as from the Content Manager to the aircraft to automatically distribute InFlight Entertainment Content to the aircraft in an efficient and timely manner.

What is claimed:
1. A system for transferring content to aircraft, the system comprising:
   a mobile content delivery node comprising a wireless personal communication device that is temporarily located on-board an aircraft, the wireless personal communication device including:
      a memory storing a portion of aircraft content data that is to be uploaded from the wireless personal communication device for storage at an aircraft content network manager on-board the aircraft, the aircraft content data uploaded from the wireless personal communication device and stored at the aircraft content network manager for distribution by the aircraft content network manager to respective wireless personal communication devices operated by respective passengers on-board the aircraft; and
      a device content manager configured to, based on transfer initiation control data, upload the portion of the aircraft content data stored in the memory of the wireless personal communication device to the aircraft content network manager while the aircraft is in flight,
   wherein one or more other portions of the aircraft content data are respectively transferred to the aircraft content network manager from one or more other content delivery nodes, the one or more other content delivery nodes including at least one of: another wireless personal communication device that is temporarily on-board the in-flight aircraft, another aircraft content network manager on-board another aircraft, or a terrestrial content manager.

2. The system of claim 1, wherein:
the aircraft is a first aircraft, the transfer initiation control data is first transfer initiation control data, and the aircraft content network manager is a first aircraft content network manager; and
the device content manager of the wireless personal communication device is further configured to, based on second transfer initiation control data, upload the portion of the aircraft content data stored in the memory of the wireless personal communication device to a second aircraft content network manager on-board a second aircraft while the wireless personal communication device is temporarily located on-board the second aircraft and the second aircraft is in flight.

3. The system of claim 1, wherein:
the aircraft is a first aircraft, the transfer initiation control data is first transfer initiation control data, and the aircraft content network manager is a first aircraft content network manager; and
the device content manager of the wireless personal communication device is further configured to, based on second transfer initiation control data, transfer the portion of the aircraft content data stored in the memory of the wireless personal communication device to a second aircraft content network manager on-board a second aircraft while the wireless personal communication device is temporarily located on-board the first aircraft, and the first aircraft and the second aircraft are terrestrially disposed at an airport.

4. The system of claim 1, wherein the portion of the aircraft content data stored in the memory of the wireless personal communication device and uploaded to the aircraft content network manager while the aircraft is in flight is a first portion of the aircraft content data, and a second portion of the aircraft content data is transferred to the aircraft content network manager while the aircraft is not in flight.

5. The system of claim 4, wherein the second portion of the aircraft content data is stored in the memory of the user wireless personal communication device and is uploaded to the aircraft content network manager by the device content manager of the wireless personal communication device while the aircraft is not in flight.

6. The system of claim 4, wherein:
the aircraft content network manager is a first aircraft content network manager;
the second portion of the aircraft content data is stored in a memory of the another aircraft content network manager onboard the another aircraft; and
the second portion of the aircraft content data is transferred by the another aircraft network content manager to the first aircraft content network manager while the first aircraft and the another aircraft are terrestrially disposed at an airport.

7. The system of claim 4, wherein:
the second portion of the aircraft content data is stored in a memory of the terrestrial content manager; and
the second portion of the aircraft content data is transferred by the terrestrial content manager to the aircraft content network manager while the aircraft is terrestrially disposed at an airport.

8. The system of claim 1, wherein the transfer initiation control data is transmitted by the terrestrial content manager to the wireless personal communication device.

9. The system of claim 1, wherein the mobile content delivery node and the one or more other content delivery nodes are included in a mesh network, and wherein each of two or more content delivery nodes included in the mesh network stores a respective at least a portion of the aircraft content data.

10. The system of claim 1, wherein the wireless personal communication device is operated by a crew member of the aircraft.

11. A method for transferring content to an aircraft, the method comprising:
receiving, at a mobile content delivery node that is terrestrially disposed and that comprises a wireless personal communication device, a portion of aircraft content data that is scheduled to be loaded from the wireless personal communication device to an aircraft content network manager located on-board an aircraft for storage at the aircraft content network manager, the aircraft content data stored at the aircraft content network manager for distribution by the aircraft content network manager to respective wireless personal communication devices operated by respective passengers on-board the aircraft;
storing, in a memory of the wireless personal communication device, the portion of the aircraft content data; and
uploading, by the wireless personal communication device while the wireless personal communication device is on-board the aircraft and the aircraft is in flight, the portion of the aircraft content data stored in the memory of the wireless personal communication device to the aircraft content network manager for storage at the aircraft content network manager,
wherein one or more other portions of the aircraft content data are respectively transferred to the aircraft content network manager from one or more other content delivery nodes, the one or more other content delivery nodes including at least one of: another wireless personal communication device that is temporarily on-board the in-flight-aircraft, another aircraft content network manager on-board another aircraft, or a terrestrial content manager.

12. The method of claim 11, wherein:
the aircraft is a first aircraft and the aircraft content network manager is a first aircraft content network manager; and
the method further comprises uploading, by the wireless personal communication device, the portion of the aircraft content data stored in the memory of the wireless personal communication device to a second aircraft content network manager on-board a second aircraft while the wireless personal communication device is on-board the second aircraft and the second aircraft is in-flight.

13. The method of claim 11, wherein:
the aircraft is a first aircraft and the aircraft content network manager is a first aircraft content network manager; and
the method further comprises transferring, by the wireless personal communication device, the portion of the aircraft content data stored in the memory of the wireless personal communication device to a second aircraft content network manager on-board a second aircraft while the wireless personal communication device is on-board the first aircraft, and the first aircraft and the second aircraft are terrestrially disposed at an airport.

14. The method of claim 11, wherein:
the portion of the aircraft content data is a first portion of the aircraft content data; and
a second portion of the aircraft content data is transferred to the aircraft content network manager while the aircraft is not in flight.

15. The method of claim 14,
wherein the second portion of the aircraft content data is stored in the memory of the wireless personal communication device; and
the method further comprises uploading, by the wireless personal communication device, the second portion of the aircraft content data stored in the memory of the wireless personal communication device to the aircraft content network manager while the aircraft is not in flight.

16. The method of claim 14, wherein the second portion of the aircraft content data is stored in the memory of the another aircraft content network manager onboard the another aircraft and is transferred to the aircraft content network manager by the another aircraft content network manager while the aircraft is terrestrially disposed at an airport.

17. The method of claim 14, wherein the second portion of the aircraft content data is stored in the memory of the terrestrial content manager and is transferred to the aircraft content network manager while the aircraft is terrestrially disposed at an airport.

18. The method of claim 11, wherein:
the terrestrial content manager transmits transfer initiation control data to the wireless personal communication device; and
uploading, by the wireless personal communication device, the portion of the aircraft content data stored in the memory of the wireless personal communication device comprises uploading, by the wireless personal communication device, the portion of the aircraft content data based upon the transfer initiation control data.

19. The method of claim 11, wherein the portion of the aircraft content data is scheduled by the terrestrial content manager to be loaded onto the aircraft.

20. The method of claim 11, further comprising authenticating the wireless personal communication device as a temporary mobile content delivery node of a mesh network via which respective aircraft content data is transferred to respective aircraft.

* * * * *